Sept. 22, 1964 H. T. CARTER 3,150,238

RELAY CONTROL CIRCUIT

Filed Oct. 30, 1961

INVENTOR
H. T. CARTER
BY [signature]
ATTORNEY

United States Patent Office 3,150,238
Patented Sept. 22, 1964

3,150,238
RELAY CONTROL CIRCUIT

Herman T. Carter, Madison, N.J., assignor to Bell Telephone Laboratories, Incorporated, New York, N.Y., a corporation of New York Filed Oct. 30, 1961, Ser. No. 148,760
8 Claims. (Cl. 179—99)

Figures 1A, 1B:
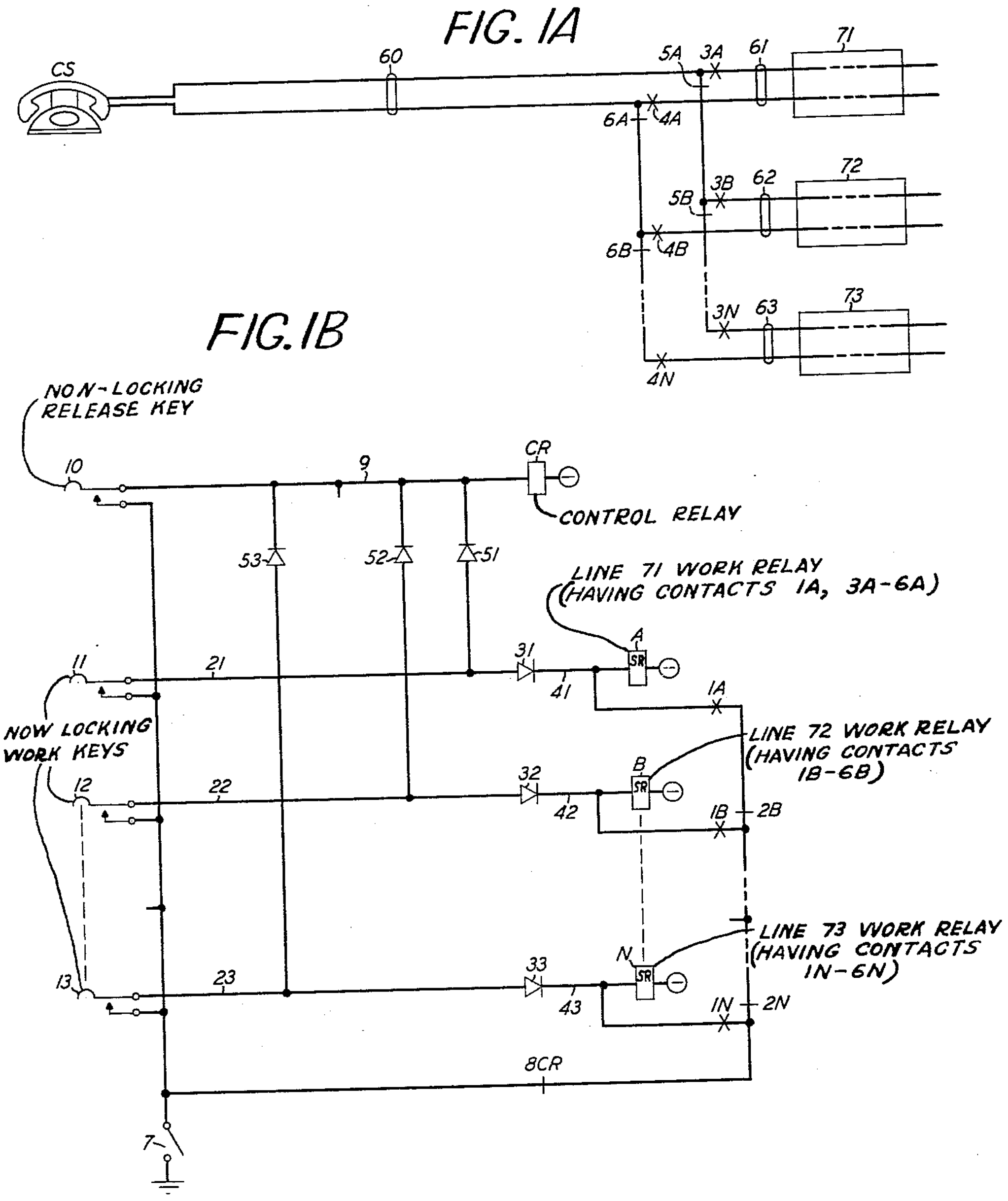

My invention relates generally to relay control circuits for controlling the operation, locking and releasing of relay devices and more particularly to improvements in such control circuits whereby economies are realized in such areas as quantity of parts and simplicity of components.

In specific aspect, my invention relates to improvements in telephone station switching system relay control circuits useful for interconnecting telephone stations with a plurality of lines or other telephone stations.

There are many such control circuits employed in telephone stations switching systems wherein the subscriber is provided with a plurality of keys for controlling the interconnection of his telephone set with any one of a plurality of telephone lines. Each of these keys is connected to a control circuit which is associated with a particular line. By operating one of the keys at the subscriber's station, the control circuit is actuated to interconnect the station with the selected line. Subsequent operation of a different key actuates a different control circuit which, by virtue of control means common to all such control circuits, releases the previously established connection and interconnects the subscriber's station with the newly selected line.

Electrical control circuits for performing these functions are well known; however, they usually employ work relays having a multitude of intricate contact arrangements and numerous releasing and locking relays, etc. Circuits of this prior type necessitate large numbers of conductors to interconnect the work relays with the releasing and locking relays and to interconnect the work relays with the keys at the control station. In addition, complex contact arrangements often require considerable tedious adjustments and frequent readjustments in order for the system to continue functioning properly.

Mechanical arrangements are also known wherein work relays are interrelated with mechanical interlocks. These systems are cumbersome, complicated and subject to the excessive wearing out of the many moving parts that interlock the devices.

One principal object of my invention is to simplify such relay control circuits, making them more economical and still reliable.

It is another object of my invention to reduce the number of control leads involved in such relay control circuitry.

It is still another object of my invention to permit the use of simple relays and keys in such circuitry.

It is a further object of my invention to prevent the false operation of certain relays due to sneak current flowing on interconnecting conductors.

My present invention accomplishes substantially the same results as prior such arrangements but in a simple, reliable and economical way.

In one exemplary embodiment of my invention I have depicted a control system which includes a plurality of control circuits each used for interconnecting a telephone station with a particular one of a plurality of line circuits. These line circuits may be of any well-known type for providing the necessary talking and signaling arrangements on telephone lines such as central office trunks, tie lines, intercommunicating lines etc. Each control circuit has a single work relay which is operated over a signaling conductor by an associated nonlocking work key located at the telephone station.

I have also provided a single control relay common to all of the work relays for controlling the locking circuits of these work relays. Although this control relay can be independently operated over a control conductor, it is essential that the control relay operate whenever any work relay is operated in order to release any previously locked operated work relay or relays. This latter function is accomplished by interconnecting the common control conductor with each of the signaling conductors.

Diodes are selectively arranged in the operating paths of the work relays and of the control relay to prevent the false operation of unwanted work relays over the common control conductor when a particular work key is operated and also to prevent the false operation of the control relay via the work relay's locking circuit after the associated work key is released.

One principal feature of my invention resides in circuitry which permits interconnecting leads to be used for multiple functions and which prevents false operation of unwanted devices.

Another feature of my invention is found in the use of gating circuitry which permits locking signals to be applied to an operated work relay but blocks such signals from the control relay.

Still another feature of my invention is embodied in the use of asymmetrical impedances to interconnect certain relays over common leads thus reducing the total number of control leads required and permitting the use of uncomplicated nonlocking keys.

A further feature of my invention resides in the reduction of interconnecting circuitry which permits the use of simple and reliable relays having uncomplicated contact arrangements.

These and other objects and features of my invention will become apparent from the following detailed description made with reference to the drawing in which:

FIG. 1A depicts a portion of a telephone station switching system having a telephone station connectable to a plurality of line circuits; and FIG. 1B shows the control system for effecting the connection of the line circuits to the station shown in FIG. 1A.

It will be obvious from the drawing and ensuing description that my invention is applicable to many types of control operations; however, I prefer to describe my invention in conjunction with a simple telephone station switching system.

Throughout the drawing and specification I have used reference letters to designate the relays and reference numerals plus a letter suffix to designate the contacts controlled by the corresponding relay. For example, work relay A shown in FIG. 1B controls contacts 1A shown in FIG. 1B and contacts 3A–6A shown in FIG. 1A. Also, operated or make contacts (such as contacts 1B which are open when relay B is released but closed upon the operation of the relay B) are designated with an X on the conductors to which they are attached, and normal or break contacts (such as contacts 2B which are closed when relay B is released but open when relay B operates) are designated by a short line perpendicular to the conductors to which they are attached.

Turning now to FIG. 1A of the drawing, the illustrative embodiment of my invention comprises a portion of a telephone station switching system including a station CS having switchhook contacts 7 (shown in FIG. 1B), a plurality of line circuits 71 through 73, communication paths 60 through 63 for selectively connecting the station with any of the line circuits, and a control system (shown in FIG. 1B) for determining the selective connections.

The control system in FIG. 1B comprises a plurality of work relays A, B through N, each associated with a particular line circuit, and a control relay CR. The work relays A, B, etc. are provided in any number required for a particular system; however, only one control relay is needed for the entire system.

The control system also comprises a plurality of nonlocking work keys 11 through 13 (one for each line circuit shown in FIG. 1A) and a release key 10 for the entire system.

The control system is assumed to be in a normal condition when the telephone station CS is "on hook," so that its switchhook contacts 7 are open, and when all of the keys and relays are released.

The energizing circuit for only work relay B will be described, since the circuits for all other work relays are identical.

Referring now to FIG. 1B, relay B comprises a winding connected in series with a negative battery source, energizing conductor 42, work diode 32, signaling conductor 22, nonlocking work key 12, switchhook contacts 7 and ground.

The negative battery source, as shown by a dash inside of a circle, has its positive terminal connected to ground. Although several negative battery sources are shown in the drawings, this is not intended to imply that they are different. They each could be of a different magnitude, but for practical purposes I have found it convenient to use a single source.

When the subscriber CS lifts his receiver (closing switchhook contacts 7) and operates work key 12, a positive pulse is sent over signaling conductor 22, through work diode 32, over energizing conductor 42, thence through the winding of work relay B to the negative battery source. Diode 32 and all other diodes in this embodiment are poled so that they offer low impedance to current flow when the anode (as shown by the arrow) is more positive than the cathode (as shown by the line across the tip of the arrow) and high impedance to current flow when the cathode is more positive with respect to the anode.

Since only a momentary closure of the energizing circuit is needed, I have used a nonlocking key. It will be obvious, however, to those skilled in the art that any convenient switching device, such as the contacts of a relay could also be used in place of any of the keys shown.

Relay B also comprises two sets of working contacts 1B and 2B in FIG. 1B. Make contacts 1B close when work relay B operates to partially close through a locking circuit. The locking circuit is completed through a chain of break contacts, such as 2N of work relay N to ground through break contacts 8CR of control relay CR. This locking chain arrangement is well known in the art and assures that only one work relay will lock operated. Break contacts on the selected work relay (such as 2B) open the locking circuit for succeeding work relays (such as work relay A) in the chain, and preceding work relays in the chain (such as work relay N) must be released in order to close through the locking circuit (contacts 2N) for a selected work relay, such as relay B.

It will be obvious to those skilled in the art that many other locking circuits can readily be substituted for the locking circuit shown in the drawing without departing from the essence of my invention.

Control relay CR in FIG. 1B comprises a winding in series with negative battery source, common control conductor 9, nonlocking control key 10 and ground at switchhook contacts 7. Relay CR also comprises a pair of break contacts 8CR in the locking circuit for work relays A, B, etc. as discussed before.

In addition, control conductor 9 is connected to each signaling conductor 21, 22 and 23 with a respective control diode 51, 52, and 53.

Referring now to FIG. 1A, contacts 3A through 6A, 3B through 6B, etc. represent the utilization contacts of the work relays A, B, etc. (shown in FIG. 1B), and these contacts are used to interconnect the telephone communication path 60 of station CS with the communication path 61, 62 or 63 of the respective line circuits 71, 72 or 73. Associated with station CS are all of the work and control keys 10 through 13.

It is well known in the art that a talking connection can be established over a pair of conductors between a telephone station and a line circuit. I have purposely simplified the schematic representation of the telephone station and the line circuit, omitting the necessary ringing and signaling arrangements, since these are also well known and need not be shown in detail in order to understand my invention.

Now should it be desired to establish a talking connection between the station CS and a particular line circuit, say 72, the subscriber lifts his receiver, closing switchhook contacts 7 in FIG. 1B, and momentarily depresses work key 12 also in FIG. 1B causing a positive current pulse to flow from ground at switchhook contacts 7, through the operated key 12, over signaling conductor 22, thence through work diode 32, over energizing conductor 42, through the winding of work relay B to the negative battery source connected to the right side of the winding. The winding is energized, and relay B operates, closing make contacts 1B.

This positive pulse over signaling conductor 22 also flows through control diode 52, thence over common control conductor 9, and through the winding of control relay CR. The winding of relay CR is sufficiently energized to operate the relay CR and open break contacts 8CR which perform no useful function at this time. The positive pulse on common control conductor 9 is prevented from flowing to other signaling paths such as 21 and 23 by control diodes 51 and 53 respectively, which are high impedance as each of their cathodes is more positive than their respective anodes.

Work relays A, B, through N are designed so that they are slower to release than control relay CR. This can be accomplished, for instance, by using a combination of work relays having slow release characteristics with a control relay having a normal release characteristic or by using a combination of work relays having normal release characteristics with a control relay having a fast release characteristic.

Upon cessation of the positive pulse, when key 12 is released, the windings of relays B and CR begin to deenergize, and both relays start to release. Because of the different releasing characteristics of work relay B with respect to control relay CR, relay B will remain operated, holding its make contacts 1B closed, until relay CR is sufficiently de-energized to fully release. When relay CR releases, prior to the release of relay B, a path is provided from ground at switchhook contacts 7, through the normal contacts 8CR, through the normal contacts 2N of relay N, thence through the still operated contacts 1B, and over energizing conductor 42 connected to the left side of the winding of relay B. The winding of relay B is sufficiently energized over this path to hold relay B operated.

This positive holding potential, applied to the winding of relay B (from contacts 8CR) in lieu of the original operating potential applied to the winding of relay B (from key 12), is prevented from reoperating control relay CR by work diode 32. Diode 32 is in a high impedance state since the cathode (connected through the previously traced holding path to positive ground at contacts 8CR) is more positive than the anode which is connected to the negative battery on the right side of the winding of the CR relay. What current may flow through this path is sufficiently small so as not to reoperate control relay CR.

It will be apparent to those skilled in the art that many other types of signals can be used and that my invention is not limited to the application of positive signals on the signaling and control paths. For instance, one may desire to substitute signals of a negative potential. This substitution could readily be accomplished by connecting negative potential to all the keys, reversing the polarity of all of the diodes and placing a positive source of potential on the windings of all of the relays.

It will be seen in FIG. 1A that a talking connection is established from station CS, over communication path 60, through normal contacts 5A and 6A of work relay A, thence through operated contacts 3B and 4B of the now held operated work relay B, and over communication path 62 to line circuit 72.

Should it now be desired to release the talking connection to line circuit 72 and establish a similar connection to another line circuit, say 71, it is only necessary to momentarily depress nonlocking work key 11 associated with line circuit 71. Closure of key 11 in FIG. 1B causes a positive current pulse to flow over signaling conductor 21, through work diode 31, over energizing conductor 41, thence through the winding relay A to the negative battery connected to the right side of the winding. The winding of relay A is energized causing relay A to operate and close its make contacts 1A.

This positive pulse flowing over signaling conductor 21 also flows through control diode 51, thence over common control conductor 9 and through the winding of control relay CR to negative battery, thus operating the CR relay. The pulse on the control conductor 9 is prevented from operating work relay N by control diode 53 since this diode offers high impedance to current flow when the cathode is more positive (positive ground on the common control lead) with respect to the anode (negative battery on the anode from the winding of work relay N).

Relay CR in operating opens the previously traced holding circuit at contacts 8CR for the held operated relay B. Relay B releases after a short interval of time determined by its slow release characteristic and does not reoperate since control diode 52 is now in a high impedance condition similar to diode 53 and blocks passage of the positive pulse from control conductor 9 to signaling conductor 22.

Upon cessation of the positive pulse, when key 11 is released, the windings of relays A and CR begin to deenergize, and relays A and CR start to release. As previously mentioned, control relay CR will release before work relay A to establish a holding circuit for relay A. With relay CR released, ground is extended from switchhook contacts 7, through the normal contacts 8CR of relay CR, through the normal contacts 2N of the N relay, thence through the normal contact 2B of the now released B relay, through the still operated contacts 1A of relay A, over energizing conductor 41 and through the winding of relay A to negative battery. The winding of relay A is sufficiently energized over this path to hold the A relay operated.

This positive holding potential will not reoperate relay CR, since work diode 31 is in a high impedance condition (i.e., its anode is connected to negative battery through the winding of the CR relay, and its cathode is connected to the positive holding potential applied to the left side of the winding of work relay A.)

With relay A operated and relay B released in FIG. 1B, station CS has its communication path 60 in FIG. 1A connected to the communication path 61 of line circuit 71 through the operated contacts 3A and 4A of relay A.

It will be apparent now that the momentary operation of any of the work keys 11, 12 or 13 will cause the operation of the associated work relays A, B, or N in FIG. 1B to connect the communication path 60 of station CS with the desired line circuit 71, 72, or 73 (shown in FIG. 1A) and will cause the release of any of the previously operated work relays A, B through N disconnecting the previously established talking connection.

Should it be desired to release any established talking connection without establishing a new connection, control key 10 in FIG. 1B is momentarily depressed to operate control relay CR independently of the work relays A, B, etc. With key 10 operated, ground is connected directly over common control conductor 9 and through the winding of control relay CR to negative battery. The winding of the CR relay is energized to operate relay CR which opens its break contacts 8CR to release any previously operated work relay. This positive potential on the common control lead is blocked from the energizing conductors of all of the work relays by the high impedance condition of control diodes 51, 52 and 53. When key 10 is released the energizing circuit for relay CR is opened and relay CR releases.

If subscriber CS does not desire to establish any further connections he replaces his receiver on hook, opening switchhook contacts 7 to restore the system to normal.

While I have described one preferred embodiment of my invention here for illustrative purposes, it will be understood that a variety of other embodiments will be apparent to persons skilled in the art without departing from the spirit and scope of the invention.

What is claimed is:

1. A relay control circuit comprising a work relay having contacts controlled thereby, a control relay having contacts controlled thereby, said work relay being slow-to-release relative to said control relay, first switch means for energizing said work relay and for energizing said control relay, said first switch means connected to said first relay through a first unidirectional current element and connected to said control relay through a second unidirectional current element, said unidirectional elements being similarly poled with respect to said first switch means, a locking path for said work relay including said work relay contacts and said control relay contacts, and second switch means for energizing said control relay independently of said unidirectional elements.

2. A relay control circuit comprising a work key, a pair of similarly poled diodes each having a first and second terminal, said first terminals of said pair being connected to said work key, a work relay comprising make contacts controlled thereby and an operating winding having two sides wherein said first side is connected to said second terminal of one of said diodes, a control relay comprising an operating winding and break contacts controlled thereby, said control relay winding being connected to said second terminal of said other diode, a holding path for said work relay under control of said work relay contacts and said control relay contacts, said work relay being slower-to-release than said control relay, and a control key connected to said control relay winding independently of said diodes, whereby momentary closure of said work key momentarily operates said control relay and operates said work relay, whereby subsequent release of said control relay establishes said holding path before said work relay can release, and whereby closure of said control key operates said control relay thereby to disestablish said path.

3. A relay control system comprising a plurality of work relays each having contacts, a single control relay having contacts, said work relays being slow-to-release relative to said control relay, each of said work relays having switch means connected thereto through a corresponding first unidirectional current element, each said switch means being connected to said control relay through a corresponding second unidirectional current element, said unidirectional current elements being similarly poled relative to said switch means, and a common locking path for said work relays, said common locking path including said control relay contacts and said common locking path being connected to each work relay through corresponding work relay contacts.

4. A relay control system comprising a plurality of nonlocking keys; a pair of similarly poled diodes associated with each said key, said diodes each having a first and second terminal, said first terminals of each said pair being connected to said associated key; a work relay for each said key, each said work relay comprising make contacts and an operating winding having two sides, wherein said first side is connected to said second terminal of one diode of said pair associated therewith; a single control relay comprising an operating winding and break contacts controlled thereby, said control relay winding being connected in common to said second terminals of other diodes of all said pairs; a common holding path for said work relays and including said control relay contacts; an individual holding path corresponding to each said work relay and including said corresponding work relay contacts connecting said common path to the first side of the winding of said corresponding work relay; said work relays being slow-to-release relative to said control relay; whereby momentary operation of any key momentarily operates said control relay and operates the corresponding work relay, whereby the momentary operation of said control relay causes said control relay contacts to open said common holding path, and whereby the release of said control relay at the end of said momentary operation thereof causes said control relay contacts to close said common holding paths before said operated work relay can release.

5. In a telephone station switching system, a station, a plurality of line circuits, communication paths for selectively connecting said station to any one of said line circuits, and a key control system for determining said selective connections, said key control system comprising a nonlocking key for each said line circuit, a first relay for each said line circuit, said first relay having make contacts and other contacts, a first diode for each said line circuit, each said first diode interconnecting the corresponding key with the corresponding first relay, a single second relay having break contacts, a second diode for each said line circuit, each said second diode interconnecting the corresponding key to said second relay, like terminals of said first and said second diodes being connected to said keys, said first relays being slow-to-release relative to said second relay, a common holding path for said first relays, said common holding path including said break contacts, each of said first relays being connected to said holding path through its said make contacts, and said communication paths including said other contacts of said first relays.

6. In a telephone station switching system, a station, a plurality of line circuits, communication paths for selectively connecting said station to any of said line circuits, and a control system for determining said selective connections, said control system comprising switch means for each said line circuit, a first relay for each said line circuit and having contacts associated therewith, a single second relay, said first relays being slow-to-release relative to said second relay, circuit means connecting each said switch means with said corresponding first relay and with said second relay, said switch means selectively operable for applying a momentary energizing signal to said circuit means, said circuit means responsive to a signal applied by any selected switch means for permitting said signal to be transmitted from said selected switch means to said second relay and only to said first relay corresponding to said selected switch means for momentarily operating said second relay and for operating said selected first relay associated therewith, holding means effective under control of said first and second relays for holding operated only said selected first relay upon the cessation of said signal when said second relay releases before said first relay can release, and wherein said communication paths are selectively connected by said associated contacts of said operated first relays.

7. In a telephone station switching system, a station, a plurality of line circuits, communication paths for selectively connecting said station to any of said line circuits and a control system for determining said selective connections, said control system comprising switch means for each said line circuit, a first relay for each said line circuit and having a winding and a plurality of contacts associated therewith, a single second relay having a winding and contacts associated therewith, said first relays being slow-to-release relative to said second relay, a first unidirectional current carrying impedance for each of said line circuits, each first impedance connecting said corresponding switch with said corresponding first relay, a second unidirectional current carrying impedance for each of said line circuits, each second impedance connecting said corresponding switch with said common second relay, said first and second impedances corresponding to a particular said switch means being effective upon the momentary closure of said particular switch means to conduct current through said corresponding first relay winding and through said second relay winding thereby to operate said corresponding first relay and said second relay, said other second impedances effective during said momentary closure of said particular switch means to prevent a relatively large current from flowing through any first relay winding other than said corresponding particular first relay winding, and a holding path for each said first relay comprising certain of said associated first relay contacts and said second relay contacts, said holding path effective upon the cessation of said momentary closure for permitting a holding current to flow through said particular first relay winding incident to the release of said second relay and before said particular first relay can release, wherein said particular first impedance is effective to prevent said holding current from flowing through said second relay winding and wherein said particular first relay operates from said current flow through its winding to effect said selective connections through others of said first relay contacts.

8. A relay control circuit comprising a work relay having a two terminal winding and contacts controlled thereby; a control relay having a two terminal winding and contacts controlled thereby; a source of potential having positive and negative terminals; a work diode and a control diode each having an anode and a cathode; a nonlocking work key and a nonlocking release key; work circuit means connecting in series said positive terminal, said work key, said work diode anode, said work diode cathode, said work relay winding, and said negative terminal; control circuit means connecting in series said positive terminal, said release key, said control relay winding, and said negative terminal; a locking conductor; a series locking control circuit comprising said positive terminal connected to said control relay contacts and said control relay contacts connected to said locking conductor; said one terminal of said work relay being connected through said work relay contacts to said locking conductor; and said control diode anode connected to said work diode anode and said control diode cathode connected to said one terminal of said control relay.

References Cited in the file of this patent

UNITED STATES PATENTS

| | | |
|---|---|---|
| 2,939,121 | Saykay | May 31, 1960 |
| 2,958,730 | Myers | Nov. 1, 1960 |